United States Patent
Beck

[11] 3,833,178
[45] Sept. 3, 1974

[54] METHOD OF COMMINUTING SYNTHETIC-RESIN ARTICLES

[76] Inventor: Erich Beck, 6520 Worms-Weinsheim, Am See 29, Worms-Weinsheim, Germany

[22] Filed: Nov. 6, 1972

[21] Appl. No.: 304,265

Related U.S. Application Data

[63] Continuation-in-part of Ser. No. 110,122, Jan. 27, 1971, Pat. No. 3,717,307.

[30] Foreign Application Priority Data
Feb. 6, 1970 Germany............................ 2005360
Nov. 12, 1971 Germany............................ 2156198

[52] U.S. Cl.......................... 241/3, 241/15, 241/23, 241/27, 241/46.11
[51] Int. Cl............................................. B02c 13/06
[58] Field of Search.............. 241/3, 15, 17, 23, 27, 241/46.11, 46.17

[56] References Cited
UNITED STATES PATENTS
2,265,936  12/1941  Cowles.............................. 241/46 R
2,289,612  7/1942   Wells................................. 241/46 R
3,624,796  11/1971  Brociner............................ 241/23
3,717,307  2/1973   Beck.................................. 241/15

Primary Examiner—Granville Y. Custer, Jr.
Attorney, Agent, or Firm—Karl F. Ross; Herbert Dubno

[57] ABSTRACT

A method of and an apparatus for the comminution of synthetic-resin articles wherein a rotatable grinder operating at high speed in a container comminutes the articles and, at the same time, agitates the pieces of synthetic resin in a washing liquor containing a washing agent so that both washing and comminution occur simultaneously.

6 Claims, 2 Drawing Figures

PATENTED SEP 3 1974  3,833,178

METHOD OF COMMINUTING SYNTHETIC-RESIN ARTICLES

CROSS-REFERENCE TO COPENDING APPLICATION

The present application is a continuation-in-part of my copending application Ser. No. 110,122 filed Jan. 27, 1971 and entitled "METHOD OF PREPARING REGRIND", now U.S. Pat. No. 3,717,307 issued Feb. 20, 1973.

FIELD OF THE INVENTION

The invention relates to a method for the subdivision of synthetic-resin articles and, more particularly, to a system for the comminution of synthetic-resin foils, synthetic-resin bags, hollow bodies, deep-drawn and like articles of thermoplastic material to obtain a powder therefrom for reuse by extrusion or other fabrication techniques.

BACKGROUND OF THE INVENTION

In my copending application Ser. No. 110,122 mentioned earlier, I have pointed out that thermoplastic products may be comminuted to form "regrind", a finely subdivided thermoplastic which can be mixed with pure synthetic-resin material and subjected to molding or any other fabrication technique for thermoplastics. Frequently, synthetic-resin residues, especially thermoplastic foils, blow-molded articles and deep-drawn articles are comminuted with residues (soil) which render the thermoplastic materials unsuitable for use in regrind. In said application I describe a system whereby regrind can be obtained free from such contaminants.

More particularly, the process involves the simultaneous washing and comminution of the soiled thermoplastic scraps. More specifically, it has been discovered that the shredding, granulating or grinding of thermoplastic scraps, especially foils, sheets and blow-molded, deep-drawn or injected molded articles, which may have been contaminated or soiled in the molding process or elsewhere, may be carried out in the presence of a washing liquid such that, when the comminuted product is separated from the washing liquid, the thermoplastic powder is free from the contaminants. The system is based upon the fact that there is an interaction between the comminutor blades and the washing liquid. More specifically, when the comminutor blades are radial blades of a rotary-blade comminutor which cooperate with stationary blades of the wall of the comminuting vessel, the blades and the washing liquid interact such that a greater proportion of soil and contamination from the thermoplastic scraps is transferred to the liquid than is possible with the most vigorous washing method used heretofore. Furthermore the presence of the washing liquid does not reduce significantly the comminuting efficiency of the apparatus and, in fact, appears to improve the quality of the comminuted product by rendering the same, after drying, more easily flowable and combinable with the virgin compound. The latter results appear to derive from the presence of a viscous medium (washing liquid) at the moment of comminution.

The thermoplastic material was comminuted in the presence of a washing liquid which may be discharged during comminution after a washing period which may be longer or shorter depending upon the degree of soiling or contamination. In general the combined washing and comminuting step may range from a period of 50 seconds to a period of 15 minutes. Upon discharge of the washing liquid, it was found that the comminuted material retains by adhesion water in an amount of some 20 to 30 percent of the dry product. It has been found to be advantageous, in this case, to transfer the moist comminuted mass into a centrifuge and to have the comminuting device connected thereto. The centrifuge reduced the water content of the comminuted material to 2 to 5 percent, whereupon the product was delivered to a drying and agglomerating stage, the final product being used in an extrusion or other molding system.

The thermoplastics with which the system of my prior application were operative and which are operative with the present system as will be apparent hereinafter, include the nylon-type polyamides, polycarbonates, polyethylenes, polypropylenes, polyacrylates, polystyrenes, acrylonitrile polymers, copolymers and terpolymers, poly vinyl chlorides, thermoplastic polyesters, vinyl acetate polymers and copolymers and vinylfluoride polymers and copolymers. The washing liquid was used in a liquor ratio (volume ratio of washing liquid to thermoplastic) of 1:1 to 1:200 or more, the latter value being determined only by the availability of the washing liquid (water) and a means for its disposal.

The washing liquid included substances facilitating the removal of soil or contaminants, e.g. soaps or detergents, and best results were obtained with such detergents as sodium alkylbenzene sulfonates in which the alkyl group contains 6 to 9 carbon atoms, and with such soaps as sodium stearate. The soap or detergent was present in amounts ranging between 0.01 and 5 percent by weight of the washing liquor. The washing temperature was ambient (say 20° to 30°C)

While the system of the aforementioned application has been found to be highly effective for the simultaneous comminution and washing of synthetic resin (thermoplastic) foils and for converting highly dirty foil articles, e.g. fertilizer sacks into a regenerated granulate, it has been found that certain strongly adherent contaminants could not be adequately removed. For this reason it has not been possible heretofore to comminute and recover as regrind, printed objects having strongly adherent printing ink contaminants, without discoloring the regrind.

OBJECTS OF THE INVENTION

It is the principal object of the present invention to provide an improved method of comminuting thermoplastic materials whereby the aforementioned disadvantages are avoided.

It is another object of the invention to provide an improved apparatus for carrying out the method and for obtaining comminuted synthetic resin in a highly non-contaminated form.

Still another object of the invention is to provide an improved method of and apparatus for the preparation of reclaimed synthetic resin (thermoplastic) which extends the principles set forth in my earlier application mentioned above.

SUMMARY OF THE INVENTION

I have now discovered, further to the teachings set forth in my earlier application identified above, that it is possible to carry out the reclamation process in a single installation when the rotor is driven at high speed and the comminuting device is of the high-speed rotary-blade impact comminutor type.

More particularly, the present invention resides in a method of comminuting synthetic resin (thermoplastic) articles, especially foils, foil sacks, blow-molded or otherwise formed hollow bodies and deep-drawn articles, in which the comminution is carried out with an impact comminutor rotor in a vessel, the comminutor rotor being rotated at high speed. The term "high speed" is used herein to define rotary speeds of 2,000 – 3,000 m/min and above, preferably using a rotary speed between 4,000 and 10,000 m/min. It has been discovered that contaminants and soil, especially strongly adherent contaminants like printing ink, can be more readily attacked by the washing fluid, preferably including a washing agent of the type described previously, when the high-speed impact-comminutor rotor is operated at the preferred speed range. While I do not wish to be bound by a theory in this regard, I believe that, at such high speeds, the impact of the rotor upon the articles to be comminuted, which are wetted by a film of the washing fluid, causes simultaneous subdivision of the article and impacts kinetic energy to the film in the region of the contaminant materials so as to cause them to be more readily dislodged from the substrate, i.e. the thermoplastic articles.

The pieces of thermoplastics are strongly agitated with the advantages described in my earlier application, the violent movement serving in addition to separate the contaminants from the resulting particles.

According to an important feature of the present invention, the comminution is commenced in the high-speed rotary impact comminutor and the wash fluid then introduced in a continuous stream while washing fluid is continuously drained from the vessel concurrently. Preferably, the wash liquid is sprayed from the top and the liquid is removed from a point close to the bottom of the vessel, thereby forming a constantly changing wash-liquid film on the thermoplastic pieces and ensuring impact of the rotor against surfaces of the thermoplastic covered with this film. The washing process is terminated when the continuously draining liquid is found to be clear. This system has been found to be especially effective for the removal of dye coatings, printing inks and the like which may be applied to the foils or foil sacks.

As distinct from the system described in the prior application, I use the apparatus in addition for the subsequent process steps. Thus, I may open outlets along the walls of the vessel when the continuously draining liquid is found to be clear to permit the high speed rotor to centrifugally discharge the excess liquid from the comminuted product. If the high speed rotor continues in operation subsequent to the discharge of the liquid phase by centrifugation, the heat developed by friction and impact within the vessel may bring the temperature at the surface of the particles to a relatively high point, e.g. above the boiling point of the liquid phase, to vaporize the liquid phase and dry the powder.

According to the invention, moreover, I may reduce the speed of the rotor and, without removing the powder from the vessel, add a granulating liquid or other cooling medium and permit the powder to agglomerate in the formation of granules. Only then is it desirable to discharge the product.

The system of the present invention thus differs from that described in my earlier application in that all three process steps, namely, the combined comminution and washing, the centrifugation and drying and the granulation are carried out in a single vessel, the impact comminutor rotor functioning as an impact comminutor blade in the first stage, as an impeller in the second state, and as a stirrer in the third state. The separator centrifuge and separator granulator described in the prior application are thus eliminated.

To carry out the process, according to the invention, therefore, there is provided a device having an upright vessel about the vertical axis of which a high-speed impact comminutor rotor is angularly displaceable, the vessel being provided with an inlet and an outlet for the continuous passage of the washing fluid therethrough. The individual blade arms of the rotor extend radially outwardly toward the wall of the vessel which is preferably cylindrical. The washing fluid inlet is preferably located above the comminuted material in the vessel while the outlet may be provided proximal to the base thereof and can be formed with a perforated-plate or sieve-covered opening to retain the particles of comminuting material but permit the passage of the wash liquid. The device may also be provided with outlets for the granules and an inlet for the particles.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
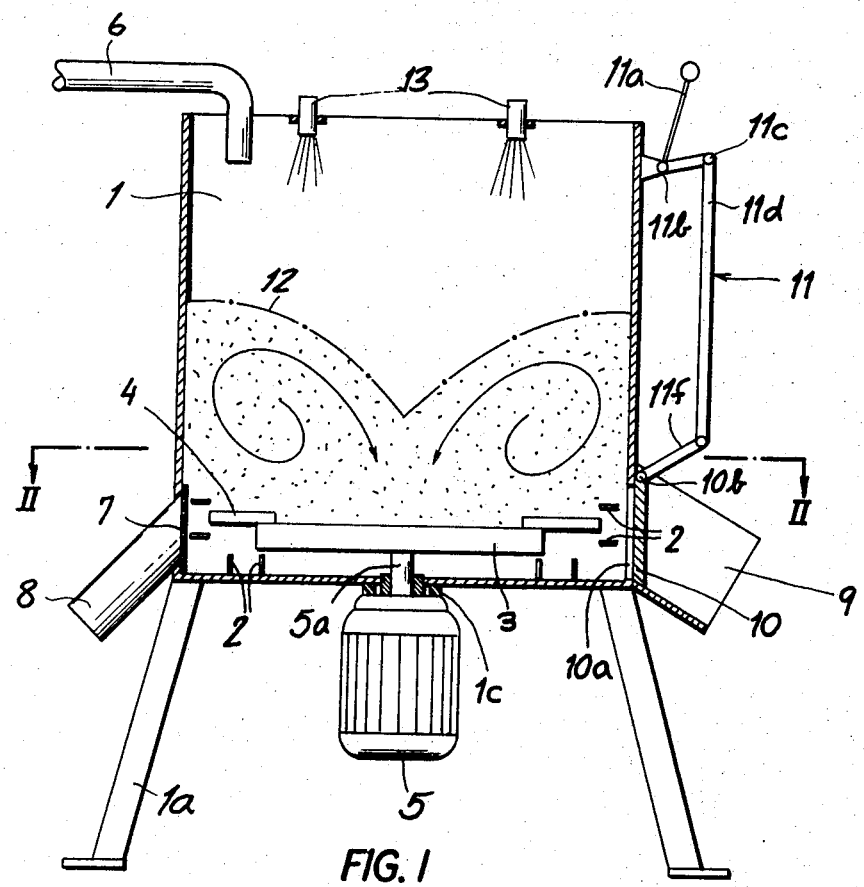
FIG. 1 is a vertical cross-sectional view through a system embodying the present invention.
Figure 2:
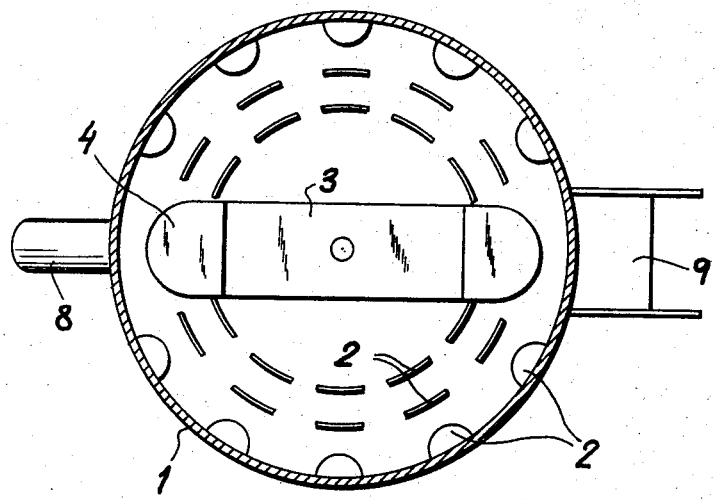
FIG. 2 is a cross-section taken along the line II — II of FIG. 1.

In FIGS. 1 and 2 of the drawing, there is shown a cylindrical vessel 1 mounted on legs 1a and having a bottom on which a motor 5 is fastened. The shaft 5a of this motor passes through a seal 1c in the bottom 1b and is connected to a rotary blade 3 carrying comminuting tips 4 at the ends of its arms.

A supply conduit 6 for the wash liquid opens into the vessel 1 at its upper end while an outlet 8 for the wash liquid is provided adjacent the floor and is covered by a perforated blade or sieve 7. The vessel is also provided with a downwardly extending chute 9 at an opening 10a in the vessel wall adjacent the floor 1b thereof and is provided with a flap 10 pivotally connected at 10b to the wall of the vessel and displaceable by an actuating arrangement generally represented at 11. The actuating arrangement 11 comprises a bellcrank lever 11a fulcrumed at 11b to the vessel and articulated at 11c to a tie rod 11d. A pivot connects a rod 11f with tie rod 11d, the rod 11f being rigid with the plate 10. When the plate or flap 10 is swung in the counterclockwise sense, the granular substances are discharged through the chute. The floor and walls of the vessel are provided, adjacent the blades 3 and tips 4, with inwardly projecting stationary blades generally represented at 2 and described in detail in the above-identified application. As can be seen from the drawing, each of the blades 2 is of arc-segmental configuration, the blades along the wall lying in a horizontal plane above the semicircular blade tips 4 carried by the arms 3 and reach inwardly substantially to the orbit of these tips. Another but similar array of blades lies in a horizontal plane below the tips 4.

In operation, the flap 10 is closed and the coarsely comminuted or cut-up pieces of the thermoplastic material, or the thermoplastic in a noncomminuted form, is thrown into the vessel 1 through the open top and the blades 3 and tips 4 set in rotation. Simultaneously, washing fluid (water containing a washing agent as described) is introduced into the vessel through line 6 and soublizes the soil and contaminating substances or mechanically removes them from the synthetic-resin pieces simultaneously comminuted by the blades. The sieve 7 permits the wash liquid to run off continuously but prevents discharge of the synthetic-resin particles.

The duration of the washing phase depends, of course, on the degree of contamination but is readily determined by observing the discharged liquid. When the liquid is clear, supply of the wash liquid is discontinued and the blades 3 and tips 4 permitted to continue to rotate. The high-speed rotor entrains the powder descending in the illustrated vortex represented at 12, outwardly at a high velocity and in a circular pattern around the axis of the vessel, thereby centrifugally dislodging the water which emerges through the outlet 8. As the adherent water is centrifugally removed, the continued rotation of the blade raises the temperature of the powder and brings about evaporation of residual washing liquid.

Toward the end of the last stage, the blade may be slowed down and a cooling fluid, preferably a liquid introduced into the vessel to cause the softened particles (at the elevated drying temperature) which have agglomerated to form a substantially uniform granulate which can be discharged from the outlet chute 9 for use in calenders, extruders and the like.

SPECIFIC EXAMPLES

EXAMPLE I 50 kg of polyethylene scrap obtained from a blow-molding residue and contaminated both internally and externally as a result of storage on the floor of a blow-molding plant, is introduced into the apparatus illustrated in FIGS. 1 and 2 with a bulk capacity of 100 liters. The rotary blades were driven at a speed of about 2,000 m/min for a period of several seconds thereby comminuting and shredding the scrap to a maximum dimension of 5 cm was realized. At this point, wash water at ambient temperature was introduced at a quantity sufficient to cover the shredded scrap and the blade rotation continued. The wash water contained 0.1 percent by weight sodium alkyl benzene sulfonate with an alkyl group carbon number of 8. Washing and comminution continued until the liquid was clear, corresponding to a washing time of several minutes. When the material was drained, it was found to be in the form of platelets with a wide distribution of sizes and a maximum dimension of several millimeter. The size range was upwardly of 50 microns. The moisture content of about 25 percent by weight was reduced to 5 percent by weight by centrifugation whereupon the product was dried, granulated and mixed with polyethylene powder for the production of new film by extrusion. Similar results were obtained with vinyl chloride, vinyl acetate, styrene, propylene and ester-type polymers.

EXAMPLE II

Soiled polyethylene bags, conventionally printed and obtained after emptying fertilizer, were introduced in an amount of 50 kg, without prior comminution, into the vessel described in Example I. The rotor was set into operation at a speed of 7,000 m/min and wash water containing a surface-active agent was supplied as described in Example I. The washing continued for several minutes and supply of the liquid was terminated when the water was found to be clear. Although the quantity of water and the duration was about the same as that provided in Example I, the degree of contamination of the foil of the fertilizer bags was much greater and hence the same quantity of water removed greater contamination. Without reducing the speed of the blade, the adherent water was discharged by the centrifugal action in the vessel and blade operation was continued until the temperature rose to approximately the softening point of the polyethylene (110°C). The wash water evaporated and a cooling fluid was then introduced, the speed of the rotor being slowed. The powder, of a particle size between 10 and 50 microns was found to agglomerate in granules of a size suitable for use in the production of polyethylene sheets by calender. The separate centrifugation and agglomeration of Example I was eliminated. The coolant was liquid carbon dioxide or water sprayed onto the material through nozzles 13.

I claim:

1. A method of comminuting thermoplastic synthetic-resin material, comprising the step of simultaneously comminuting said material with a high-speed impact comminutor and passing a wash liquid through said material to remove contaminants therefrom during the comminution of said material.

2. The method defined in claim 1, further comprising the step of adding a washing agent to said wash liquid.

3. A method of comminuting thermoplastic synthetic-resin material, comprising the step of simultaneously comminuting said material with a high-speed impact comminutor and passing a wash liquid through said material to remove contaminants therefrom during the comminution of said material, said material being comminuted and washed in a vessel in which said impact comminutor is rotatable, said method further comprising the steps of terminating the supply of said wash liquid to said vessel upon the discharge of wash liquid therefrom becoming clear, centrifuging adherent wash liquid from the comminuted material directly in said vessel by said impact comminutor, and heating said comminuted material directly in said vessel by operation of said impact comminutor to vaporize residual wash liquid.

4. The method defined in claim 3, further comprising the step of agglomerating the comminuted material directly in said vessel subsequent to the evaporation of wash liquid therefrom.

5. The method defined in claim 4 wherein said material is agglomerated in said vessel and a cooling fluid is added thereto.

6. The method defined in claim 3 wherein said impact comminutor is a rotor operated at a speed between substantially 4,000 and 10,000 m/min.

* * * * *